(12) United States Patent
Yabe et al.

(10) Patent No.: US 7,072,642 B2
(45) Date of Patent: Jul. 4, 2006

(54) RECEIVING DEVICE AND REPEATING DEVICE

(75) Inventors: Toshiyasu Yabe, Chiba (JP); Masaki Kawabata, Saitama (JP); Shoji Kashiwaba, Yokohama (JP); Ai Nagai, Sagamihara (JP)

(73) Assignee: NTT DoCoMo, Inc., Tokyo (JP)

( * ) Notice: Subject to any disclaimer, the term of this patent is extended or adjusted under 35 U.S.C. 154(b) by 311 days.

(21) Appl. No.: 10/182,537

(22) PCT Filed: Nov. 27, 2001

(86) PCT No.: PCT/JP01/10322

§ 371 (c)(1),
(2), (4) Date: Jul. 25, 2002

(87) PCT Pub. No.: WO02/44908

PCT Pub. Date: Jun. 6, 2002

(65) Prior Publication Data

US 2002/0197981 A1    Dec. 26, 2002

(30) Foreign Application Priority Data

Nov. 28, 2000  (JP) ............................. 2000-361796

(51) Int. Cl.
*H04Q 7/22* (2006.01)

(52) U.S. Cl. .................. 455/414.1; 455/460; 455/564; 379/40; 379/51; 379/100.14; 379/157; 379/201.01; 709/219; 709/229

(58) Field of Classification Search ............ 455/414.2, 455/426.1, 456.1, 456.2, 414.1, 460, 564; 709/202–203, 215, 217, 219, 229; 379/40, 379/51, 100.14, 157, 201.01
See application file for complete search history.

(56) References Cited

U.S. PATENT DOCUMENTS

| | | | | |
|---|---|---|---|---|
| 5,937,163 A * | 8/1999 | Lee et al. | ................... | 709/218 |
| 6,035,330 A | 3/2000 | Astiz et al. | | |
| 6,381,651 B1 * | 4/2002 | Nishio et al. | ............... | 709/245 |
| 6,535,912 B1 * | 3/2003 | Anupam et al. | ............ | 709/217 |
| 6,542,812 B1 * | 4/2003 | Obradovich et al. | ........ | 701/207 |
| 6,742,030 B1 * | 5/2004 | MacPhail | ................... | 709/224 |
| 2002/0016174 A1 * | 2/2002 | Gibson et al. | ............. | 455/464 |
| 2002/0194270 A1 * | 12/2002 | Gagnon | ..................... | 709/203 |
| 2003/0039341 A1 * | 2/2003 | Burg et al. | .............. | 379/88.16 |
| 2003/0050054 A1 * | 3/2003 | Siu | ............................ | 455/418 |

FOREIGN PATENT DOCUMENTS

| | | |
|---|---|---|
| CA | 2326492 | 6/2001 |
| CN | 1180970 A | 5/1998 |
| CN | 1192547 A | 9/1998 |
| EP | 0 465 011 A2 | 1/1992 |
| EP | 0.837 592 A2 | 4/1998 |
| EP | 0 838 764 A2 | 4/1998 |
| JP | 9-265482 | 10/1997 |
| JP | 11-242620 | 9/1999 |
| JP | 11-331426 | 11/1999 |
| JP | 2000-155756 | 6/2000 |

* cited by examiner

*Primary Examiner*—William Trost
*Assistant Examiner*—James D. Ewart
(74) *Attorney, Agent, or Firm*—Brinks Hofer Gilson & Lione

(57) ABSTRACT

A mobile station MS accesses a home page of an IP server W and receives HTML data. The mobile station MS then extracts URLs, telephone numbers, and/or electronic mail addresses marked by anchor tags in the obtained HTML data and stores them with titles in the flash memory of the mobile station MS.

12 Claims, 16 Drawing Sheets

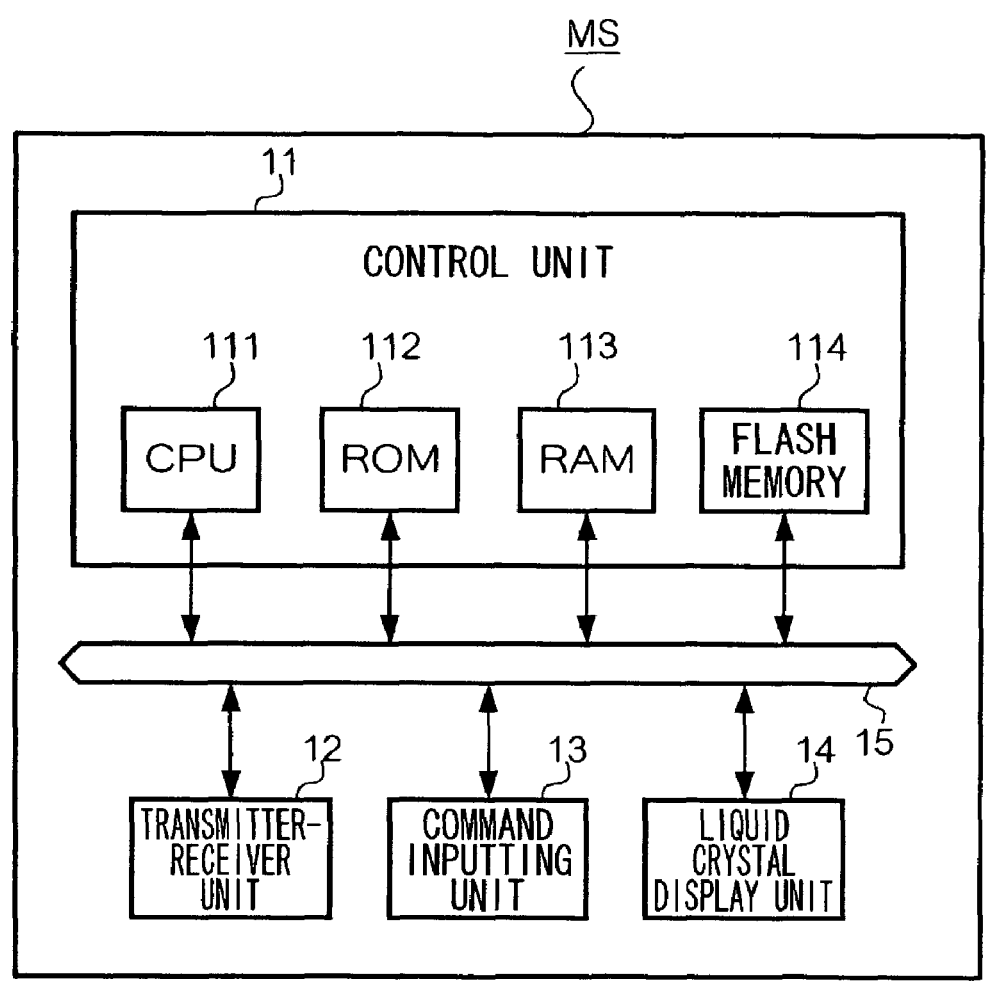

FIG. 3A

| TITLE | ADDRESS |
|---|---|
| SHIBUYA RESTAURANT GUIDE | http://www.aaa.ne.jp |
| SHINJUKU MOVIE THEATER GUIDE | http://www.bbb.ne.jp |
| IKEBUKURO SHOPPING GUIDE | http://www.ccc.ne.jp |
| ... | |

TBL1

FIG. 3B

| TITLE | ADDRESS |
|---|---|
| SHIBUYA RESTAURANT A | http://www.aaa.ne.jp/xxx |
| SHIBUYA RESTAURANT B | http://www.aaa.ne.jp/yyy |
| ... | ... |
| TEL WHERE TO INQUIRE... | 03-1111-1111 |

| TITLE | ADDRESS |
|---|---|
| SHINJUKU MOVIE THEATER A | http://www.bbb.ne.jp/xxx |
| SHINJUKU MOVIE THEATER B | http://www.bbb.ne.jp/yyy |
| SHINJUKU MOVIE THEATER C | http://www.bbb.ne.jp/zzz |
| ... | ... |

TBL2

FIG. 4A

```
<HTML>
<HEAD>
<TITLE>SHIBUYA RESTAURANT GUIDE</TITLE>
<META name="abc" content="abc">
</HEAD>
<BODY>
<CENTER>
<H2><IMG src="abcGIF" alt="SHIBUYA RESTAURANT GUIDE"
height="30" width="200"><FONT color="#004000">
SHIBUYA RESTAURANT GUIDE</FONT></H2>
</CENTER>
<BR>
<A href="http://www.aaa.ne.jp/xxx">*SHIBUYA RESTAURANT A</A>
<FONT size="-1"><BR>
THIS IS IT FOR ITALIAN CUISINE!!</FONT><BR>
<BR>
<A href="http://www.aaa.ne.jp/yyy">*SHIBUYA RESTAURANT B</A>
<FONT size="-1"><BR>
THIS IS IT FOR CHINESE CUISINE!!</FONT><BR>
<BR>
<A href="http://www.aaa.ne.jp/zzz">*SHIBUYA RESTAURANT C</A>
<FONT size="-1"><BR>
THIS IS IT FOR FRENCH CUISINE!!</FONT><BR>
<BR>
<A href="03-1111-1111">CALL US AT THIS TELEPHONE NUMBER </A>
<FONT size="-1"><BR>03-1111-1111
</BODY>
```

FIG. 4B

```
SHIBUYA RESTAURANT GUIDE

*SHIBUYA RESTAURANT A
 THIS IS IT FOR ITALIAN
 CUISINE!!

*SHIBUYA RESTAURANT B
 THIS IS IT FOR CHINESE
 CUISINE!!

*SHIBUYA RESTAURANT C
 THIS IS IT FOR FRENCH
 CUISINE!!

CALL US AT THIS TELEPHONE NUMBER
            03-1111-1111
```

FIG. 12

| TITLE | URL | TELEPHONE NUMBER | MAIL ADDRESS |
|---|---|---|---|
| SHIBUYA RESTAURANT GUIDE | http://www.aaa.ne.jp | 03-1111-1111 | aaa@aaa.ne.jp |
| SHINJUKU MOVIE THEATER GUIDE | http://www.bbb.ne.jp | 03-2222-2222 | bbb@bbb.ne.jp |
| IKEBUKURO SHOPPING GUIDE | http://www.ccc.ne.jp | 03-3333-3333 | ccc@ccc.ne.jp |
| ... | ... | ... | ... |

TBL3

*FIG. 13*

```
<HTML>
<HEAD>
<TITLE>SHIBUYA RESTAURANT GUIDE</TITLE>
<META name="abc" content="abc">
<HOMEMail>aaa@aaa.ne.jp</HOMEMail>
<HOMEPhone>03-1111-1111
</HOMEPhone>
</HEAD>
<BODY>
<BR>
<A href="http://www.aaa.ne.jp/xxx">*SHIBUYA
RESTAURANT A</A>
<FONT size="-1"><BR>
THIS IS IT FOR ITALIAN CUISINE!!</FONT><BR>
<BR>
<A href="http://www.aaa.ne.jp/yyy">*SHIBUYA
RESTAURANT B</A>
<FONT size="-1"><BR>
THIS IS IT FOR CHINESE CUISINE!!</FONT><BR>
<BR>
<A href="http://www.aaa.ne.jp/zzz">*SHIBUYA
RESTAURANT C</A>
<FONT size="-1"><BR>
THIS IS IT FOR FRENCH CUISINE!!</FONT><BR>
<BR>
<A href="03-1111-1111">CALL US AT THIS TELEPHONE
NUMBER </A>
<FONT size="-1"><BR>03-1111-1111
<A href="aaa@aaa.ne.jp"></A>
<FONT size="-1"><BR>aaa@aaa.ne.jp
</BODY>
```

US 7,072,642 B2

RECEIVING DEVICE AND REPEATING DEVICE

TECHNICAL FIELD

The present invention relates to a receiving device and a relay device which can perform the registration of addresses.

BACKGROUND ART

In recent years, mobile stations with a WWW (World Wide Web) browser have come into existence. A user of such a mobile station accesses a host, such as an information provider (hereinafter, referred to as "IP") on the Internet by using the WWW browser and can obtain a home page from the host. The home page, usually, carries data written in HTML (Hyper Text markup Language, hereinafter, merely referred to as "HTML data"). HTML data which can be retrieved from the home pages of IPs, may include URLs (Uniform Resource Locator) of other links. When a mobile station receives a home page in HTML and displays the home page on the display unit of the mobile station, a user can select a desired link embedded in the displayed home page. When the user performs a selecting operation, the mobile station then accesses the link selected by the user. The user can thereby obtain a variety of information in HTML data from the selected link. Some mobile stations are equipped with a function to register URLs of the home pages of IPs, which a user frequently accesses, so as to save labor of directly inputting the URLs when the user wants to access the IPs next time. Specifically, a title marked by a title tag in the HTML data and a corresponding URL are stored in the memory of a mobile station in relation to each other. Thereafter, when the user designates the title, the associated URL is extracted from the memory and connection is automatically had to the host designated by the URL.

When registering the URL of a certain web page, a user first needs to access the link, obtain a web page from the link and register the URL of the web page. The access operation is not only cumbersome but also has the drawback of increasing communication costs. Also, HTML data sometimes includes a telephone number in addition to URLs. However, after obtaining the HTML data and browsing the web page, a user has to memorize the telephone number to call the number.

DISCLOSURE OF INVENTION

The present invention provides a receiving device and a relay device, that can reduce the labor of users and keep down communication costs.

To solve the aforementioned problems, a receiving device of the present invention comprises: storing means; obtaining means for obtaining from an information providing device, information, including a title relating to an information source or a communicatee and access-information for accessing the information source or communicatee, the obtaining means transmitting a request for the information to the information providing device, and receiving the information from the information providing device; extracting means for extracting the title and the access-information included in the information, which has been obtained by the obtaining means; and registering means for storing, in the storing means, extracted title and access-information in correspondence with each other.

The access-information is, for example, a URL, electronic mail address, and telephone number. Using the receiving device, desired titles of information and access-information are automatically registered so that a user can easily produce an address directory of user's choice.

In one preferred form, the storing means includes a first table, and a second table; the extracting means extracts a first title, and first access-information included in the information, which has been received by the obtaining means; the registering means stores, in the first table, the extracted first title, and the first access-information; the obtaining means obtains second information from the first access-information; and the extracting means stores, in the second table, a second title and second access-information included in the received second information in correspondence with each other. In this preferred form, it becomes easy to search for registered information, by storing information in two separated tables in a hierarchical fashion as described above.

The receiving device further includes a telephone directory for storing the telephone number, and the registering means may store the telephone number in the telephone directory in the instance that, information, which has been extracted by the extracting means, is a telephone number.

The access-information is designated by identification data; and the registering means may store the title, and the access-information corresponding to the identification data in correspondence with each other. That is, different kinds of access-information (a URL, mail address, telephone number) for one title are stored in correspondence with each other. Thus, a user can obtain information by various methods.

The title is renewedly generated on the basis of extracted identification data; and the registering means may store the generated title, and access-information in correspondence with each other. Thus, a user can produce an intelligible title.

The receiving means is, for example, a mobile communication terminal served by a mobile communication network; and the information providing device is, for example, a server on the Internet.

A relay device for relaying communications between a plurality of information providing devices and a plurality of receiving devices comprises storing means having a storage area corresponding to each one of the plurality of receiving devices; obtaining means for obtaining from an information providing device, information, including a title relating to an information source or a communicates and access-information for accessing the information source or communicatee, the obtaining means transmitting a request for the information to the information providing device, and receiving the information from the information providing device; extracting means for extracting the title and the access-information included in the information, which has been obtained by the obtaining means; registering means for storing extracted title and access-information in a storage area corresponding to a receiving device, which has requested information, in correspondence with each other; and transmitting means for generating data including the title and access-information, which have been stored in the storage area, and transmitting the data to the receiving device.

It is possible to reduce the burden of carrying out the function of processing on a mobile station, by enabling a relay device to perform the processing of registration.

In another preferred form, each one of the storage area includes a first table, and a second table; the extracting means extracts a first title, and first access-information from the obtained information; the registering means stores, in the first table, the extracted first title, and the first access-information; the obtaining means receives second information from an information source designated by the first access-information; and the extracting means stores, in the second table, a second title, and second access-information included in the received second information in correspondence with each other.

The extracting means may extract the title, and the access-information, only when receiving a request for registration from the receiving device.

In the instance that, the extracting means receives a request for browsing information, the extracting means may extract the title, and the access-information from a storage area corresponding to the receiving device; and the transmitting means may generate data including the title and the access-information, and transmit the data to the receiving device.

BRIEF DESCRIPTION OF THE DRAWINGS

FIG. 2 is a block diagram showing a configuration of a mobile station MS according to the first embodiment.

FIG. 3A is a block diagram showing an example of an access destination storing table TBL1.

FIG. 3B is a block diagram showing examples of link destination storing tables TBL2.

FIG. 4A is a diagram showing an example of a source of HTML data.

FIG. 4B is a diagram showing an example of a screen image displayed on a liquid crystal display when a mobile station MS obtains the HTML data of FIG. 4A.

FIG. 12 is a diagram showing an example of an address management table TBL3 according to the second embodiment.

FIG. 13 is a diagram showing an example of a source of HTML data according to the second embodiment.

BEST MODE FOR CARRYING OUT THE INVENTION

Embodiments of the present invention will be explained below with reference to the attached drawings. In the embodiments, the present invention is practiced with a mobile communication system connected to the Internet.

[1] First Embodiment

[1.1] Configuration of First Embodiment
(1) Configuration of Entire System

Figure 1:
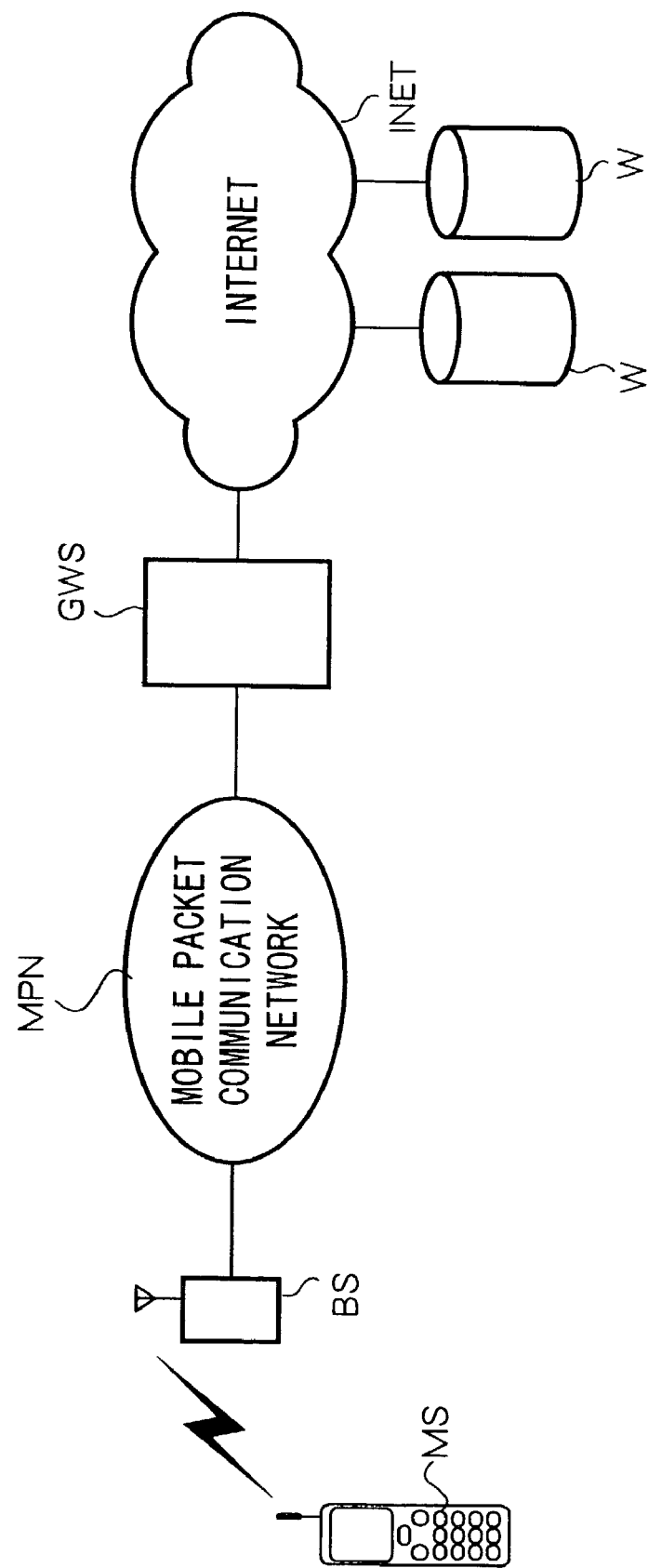
FIG. 1 is a block diagram showing a configuration of a mobile communication system according to the first embodiment.

FIG. 1 is a block diagram showing a configuration of a mobile communication system according to the first embodiment. As shown in FIG. 1, the mobile communication system comprises a plurality of mobile stations MS; a mobile packet communication network MPN; a base station BS served by mobile packet communication network MPN; a gateway server GWS; Internet INET; and a plurality of IP servers W. For simplicity, FIG. 1 illustrates one mobile station MS and one IP server W out of a plurality of mobile stations MS and IP servers W, served by the mobile communication system.

A mobile station MS performs packet communications through the mobile packet communication network MPN shown in the drawing and performs voice communications through a mobile telephone network not shown. To carry out these functionalities, the mobile station MS comprises a voice input/output unit for enabling a user to perform voice communications; a transmitter-receiver unit for performing radio communications with base stations BS; a liquid crystal display unit for displaying a variety of information; a command inputting unit through which information inputting operations such as those for inputting numerical numbers, characters and so on, are performed; and a microcomputer for controlling these units.

The gateway server GWS is a computer system installed in a mobile packet switching station for interconnecting the Internet INET with the mobile packet communication network MPN and mediates signal transmission/reception between different networks. Specifically, the gateway server GWS performs a protocol conversion to adapt data, received from a mobile station MS in the mobile packet communication network MPN, to TCP/IP (Transmission Control Protocol/Internet Protocol) used on the Internet INET, and transmits the data to the Internet INET. Further, the gateway server GWS performs a protocol conversion to adapt data received from the Internet INET to a transmission protocol used in the mobile packet communication network MPN and transmits the data to the mobile packet communication network MPN.

The gateway server GWS, upon receiving a GET request in HTTP (Hyper Text Transfer Protocol) from a mobile station MS, inspects the URL included in the GET request. If the URL is a general URL on the Internet INET, the gateway server GWS transfers the GET request to the Internet INET. The gateway server GWS then transfers, to the mobile station MS, data received from the Internet INET in response to the GET request. The gateway server GWS stores the HTML data constituting the web page. If the URL, included in the GET request received from the mobile stations MS, designates the location of a web page inside the gateway server GWS, the gateway server GWS transmits, to the mobile station MS, the HTML data constituting the web page.

An IP server W is a server on the Internet INET and stores HTML data constituting its web pages. Each web page is assigned a URL. Upon receiving a GET request, if a URL included in the GET request is the URL of a web page stored in the IP server W, the IP server W transmits the HTML data constituting the web page to the originator of the GET request.

(2) Configuration of Mobile Station MS

FIG. 2 is a block diagram showing a configuration of a mobile station MS according to the first embodiment. The mobile station MS comprises a control unit 11; a transmitter-receiver unit 12; a command inputting unit 13; and a liquid crystal display unit 14. The transmitter-receiver unit 12 performs radio communications with a base station BS in the mobile packet communication network MPN. The command inputting unit 13 is comprised of various buttons such as a PB (push button) and a cursor key. When a user operates such a button, the command inputting unit 13 provides a CPU 111 in the control unit 11 with corresponding operation data. The CPU 111 determines input command from the user on the basis of the operation data, and performs control according to the command. The liquid crystal display unit 14 comprises a liquid crystal panel and so on, and displays information under the control of the control unit 11.

The control unit 11 comprises the CPU 111; a ROM 112; a RAM 113; and a flash memory 114, and controls each unit of the mobile stations MS. The ROM 112 stores a mobile station ID for uniquely identifying the mobile station MS within the mobile packet communication network MPN. The ROM 112 also stores control information and control programs for controlling the functions of the mobile station MS and a WWW browser program for obtaining desired data from another communication device (for example, IP server W) and displaying characters and images. The ROM 112 stores a program for carrying out the process of registering addresses such as URLs (hereinafter referred to as a "URL registration program"). The RAM 113 is used as a work area by the CPU 111.

The CPU 111 reads out the control programs stored in the ROM 112 and executes the programs. For example, when the CPU 111 reads out and executes the WWW browser stored in the ROM 112, the following processes are carried out. That is, when a user designates a desired URL by means of the command inputting unit 13, the CPU 111 transmits a GET request including the URL to the mobile packet communication network MPN. Upon receiving HTML data from the IP server W through the gateway server GWS, in response to the GET request, the CPU 111 stores the HTML data in the RAM 113 and displays the screen image represented by the data on the liquid crystal display unit 14.

An access destination storing table TBL1 shown in FIG. 3A is formed in a flash memory 114 to store URLs. The access destination storing table TBL1 stores the URLs of web pages, which the mobile station has accessed, and title data for the URLs. The title data is, for example, a character string marked by a title tag included in HTML data, which the mobile station has received. Further, the flash memory 114 stores link destination storing tables TBL2 shown in FIG. 3B. The link destination storing tables TBL2 are provided, corresponding to the URLs stored in the access destination storing table TBL1. The link destination storing tables TBL2 each store addresses (URLs, mail addresses, and telephone numbers) included in the web page designated by a URL stored in the access destination storing table TBL1.

Further, each link destination storing table TBL2 stores, in correspondence with the addresses (URLs, mail addresses, and telephone numbers) of link destinations, title data for the addresses. The title data is not necessarily a character string marked by a title tag and can be an image.

[1.2] Operation of First Embodiment

Next, the operation of the present embodiment having the aforementioned configuration will be explained.

(1-1) Operation of Mobile Station MS for Registering URLs

The operation of mobile station MS for registering URLs will be explained below with reference to FIGS. 4 to 8.

When a user performs a predetermined operation with the command inputting unit 13 of the mobile station MS, the CPU 111 reads out the WWW browser program from the ROM 112 and starts to carry out the browsing function. The following processing is performed when the CPU 111 carries out the browsing function. First, the CPU 111 performs a packet registration with a packet subscriber processing unit (not shown). The packet registration is a registration procedure by which the mobile station MS can receive packet switching service from the mobile packet communication network MPN. After the packet registration is performed, the mobile station MS can perform communications with the gateway server GWS.

Then, when the user inputs the URL of a home page stored in an IP server W by means of the command inputting unit 13 of the mobile station MS, the CPU 111 of the mobile station MS transmits a GET request including the URL to the mobile packet communication network MPN through the transmitter-receiver unit 12. Upon receiving the GET request, the gateway server GWS transfers the GET request to the Internet INET. Upon receiving the GET request, the IP server W transmits HTML data, in response to the GET request, to the mobile station MS through the gateway server GWS. Next, when the transmitter-receiver unit 12 of the mobile station MS receives the HTML data from the IP server W, the CPU 111 stores the received HTML data in the RAM 113 and displays the screen image represented by the HTML data on the liquid crystal display unit 14.

FIG. 4A is a diagram showing an example of a source of HTML data, and FIG. 4B is a diagram showing an example of an image of the HTML data displayed on the liquid crystal display unit 14 of the mobile station MS. In FIG. 4A, <TITLE></TITLE> is a title tag in the HTML data. <A herf=""></A> is an anchor tag and marks a telephone number, a mail address, the URL of a link destination, or the like.

While the image shown in FIG. 4B is displayed, when the user operates the cursor key, the CPU 111 temporarily selects a menu item and highlights the temporarily selected character string. In FIG. 4B, "Shibuya restaurant A" is temporarily selected. In this situation, when the user presses a decision button of the command inputting unit 13, the CPU 111 extracts the URL marked by the anchor tag corresponding to "Shibuya restaurant A", i.e., "http://www.aaa.ne.jp/xxx". Next, the CPU 111 transmits, to the mobile packet communication network MPN, a GET request in HTTP including the URL through the transmitter-receiver unit 12.

An anchor tag may mark a telephone number. In the example shown in FIGS. 4A and 4B, the anchor tag corresponding to the character string "Please contact us" is an anchor tag that marks a telephone number. If the user presses the decision button of the command inputting unit 13 when the character string "Please contact us" is highlighted, the CPU 111 extracts the character string "03-1111-1111" designated by the anchor tag. The extracted character string comprises digits of numerals (for example, nine to eleven digits of numerals) beginning with zero. Therefore, the CPU 111 determines that the character string is a telephone number. The CPU 111 then carries out calling "03-1111-1111".

If the character string which the user has selected is, for example, the anchor tag that marks "xxx@xxx.ne.jp", the CPU 111 determines that the character string is a mail address and carries out transmitting an electronic mail to the destination of the mail address.

Figure 5:
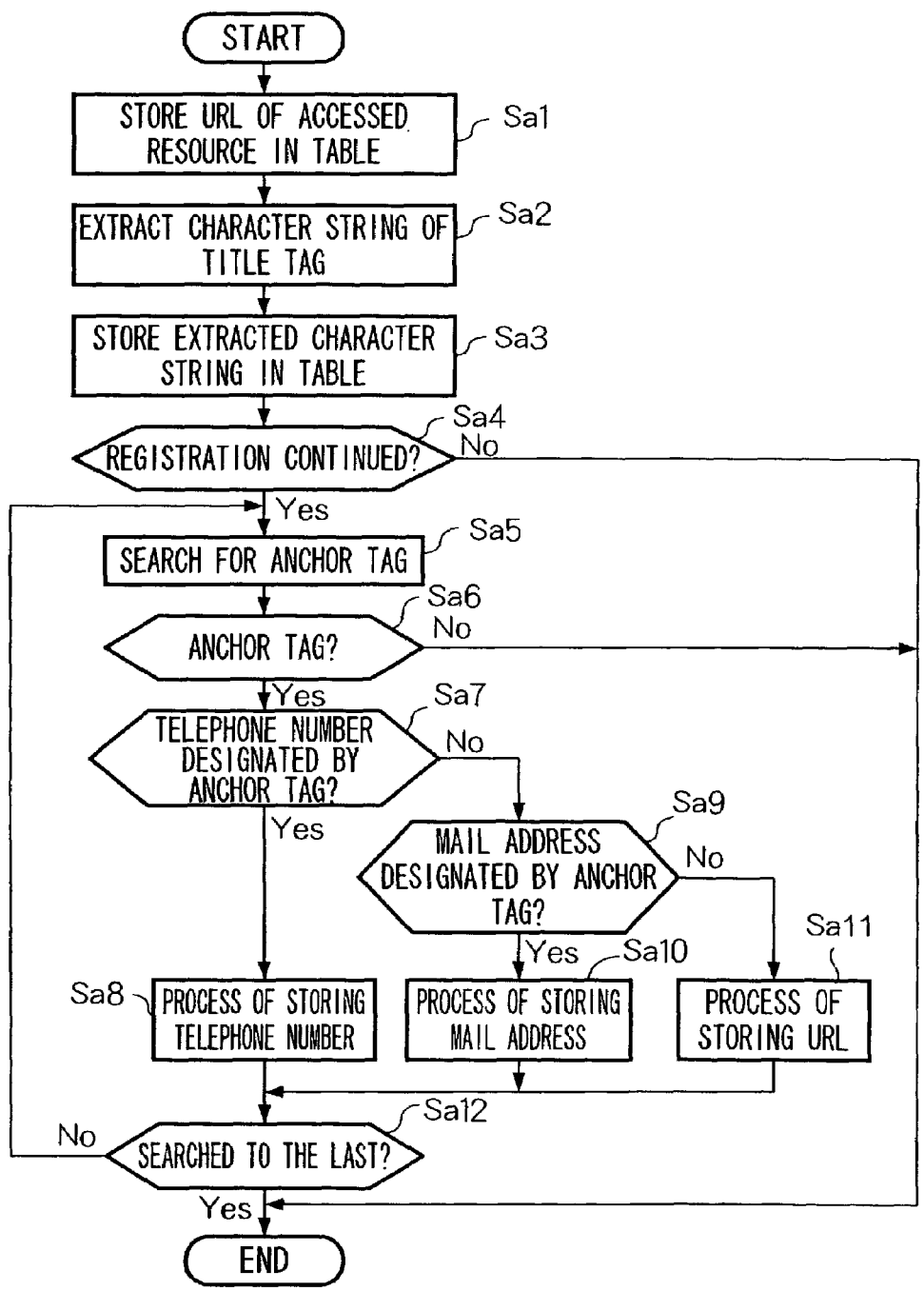
FIG. 5 is a flowchart showing a process of registering a URL by a mobile station MS according to the first embodiment.

After transmitting a GET request, calling a telephone number, or transmitting an electronic mail, when the user performs a predetermined operation with the command inputting unit 13, the CPU 111 reads out the URL registration program from the ROM 112 and carries out the processes shown in FIG. 5. Specifically, the CPU 111 stores, in the access destination storing table TBL1, the URL of the web page in the HTML data (step Sa1). Next, the CPU 111 extracts the character string marked by the title tag stored in the RAM 113 (step Sa2), and stores the character string as title data in the access destination storing table TBL1 (step Sa3).

For example, when HTML data obtained from an IP server W is such as shown in FIG. 4A, the CPU 111 extracts the character string following <TITLE> in the HTML data, that is, the character string "restaurant guide in Shibuya". The CPU 111 then stores the character string "restaurant guide in Shibuya" in the access destination storing table TBL1.

After storing the URL in the access destination storing table TBL1, the CPU 111 displays the message "Do you want to register the URL of the link destination?" on the liquid crystal display unit 14. In response to the message, if the user performs an input operation indicating that he/she wants to end the process of registration (step Sa4 "No"), the CPU 111 ends the process of registering. On the other hand, if the user performs an input operation indicating that he/she wants to register the URL of the link destination (step Sa4 "Yes"), the CPU 111 searches for the anchor tag from the top of the HTML data (step Sa5).

While searching for the anchor tag, if the anchor tag is not found in the HTML data (step Sa6 "No"), the process comes to an end. While searching, on the other hand, if the anchor tag is found (step Sa6 "Yes"), the CPU 111 determines whether the found anchor tag marks a telephone number (step Sa7). When the CPU 111 determines that a telephone number is marked (step Sa7 "Yes"), the CPU 111 carries out storing the telephone number shown in FIG. 6 (step Sa8).

Figure 6:
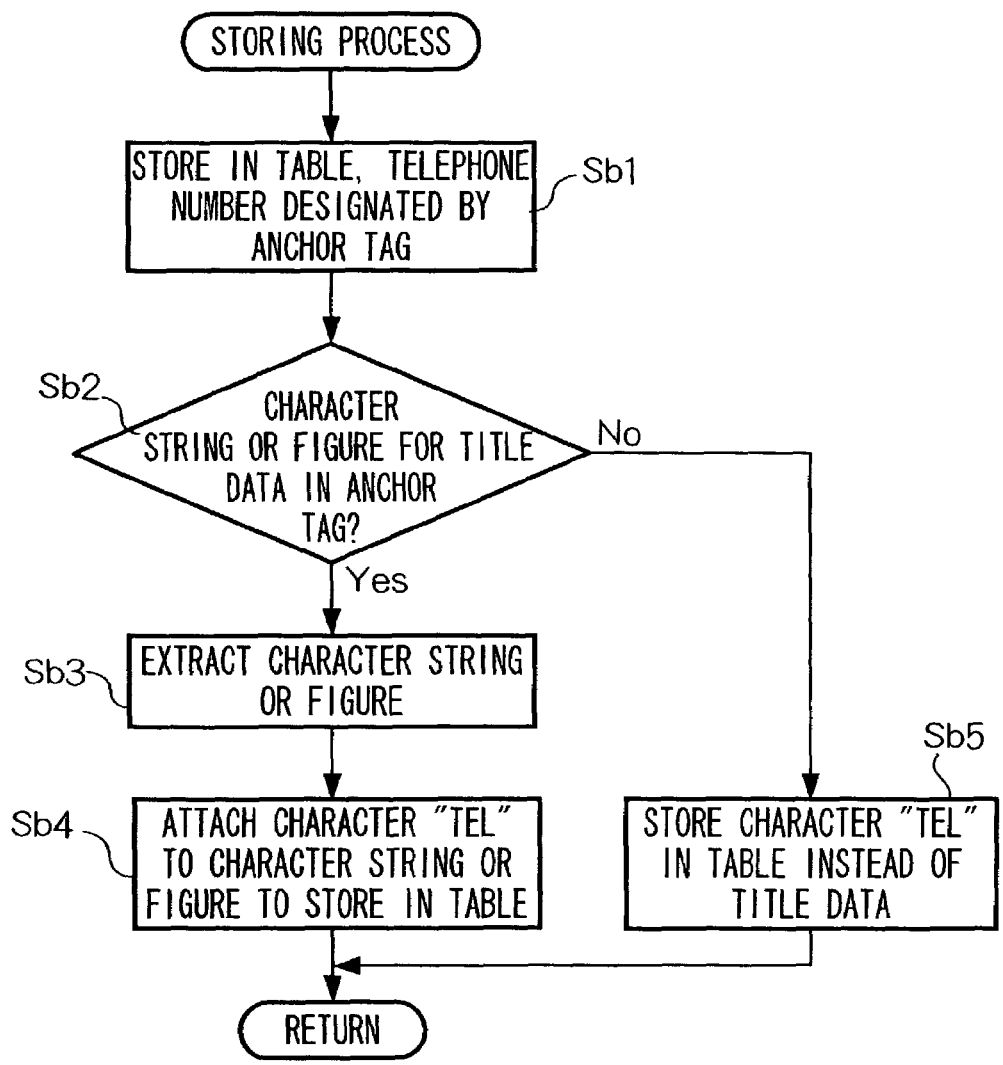
FIG. 6 is a flowchart showing a process of storing a URL according to the first embodiment.

First, the CPU 111 extracts the telephone number designated by the anchor tag and stores the telephone number in a link destination storing table TBL2 (step Sb1 in FIG. 6). The CPU 111 then determines whether or not any character string or figure which can be used as title data exists in the anchor tag (step Sb2 in FIG. 6). If such a character string or figure exists (step Sb2 "Yes" in FIG. 6), the CPU 111 extracts the character string or the figure. The CPU 111 then adds, to the character string or figure, a symbol indicating that the address designates a telephone number (for example, "TEL") and stores the character string or figure as title data in the link destination storing table TBL2 (step Sb3, step Sb4 in FIG. 6). In FIGS. 4A and 4B, for instance, the character string "Please contact us" is in the anchor tag. In this case, the CPU 111 adds, for example, the symbol "TEL" to the character string "Please contact us" and stores the character string as title data of the link destination storing table TBL2 (refer to FIG. 3B). If an image tag designating image data is marked by the anchor tag <A herf=> and </A>, the CPU 111 stores the image data as title data in the link destination storing table TBL2.

On the other hand, if no character string or figures is found in the anchor tag (step Sb2 "No" in FIG. 6), the CPU 111 stores, in the link destination storing table TBL2, a symbol indicating that the address represents a telephone number, for example, the symbol "TEL" or the like, as title data instead of storing information, such as a character string or the like, to be registered as title data. The CPU 111 then concludes the process (step Sb5).

When the anchor tag does not mark a telephone number (step Sa7 "No"), the CPU 111 then determines whether the anchor tag marks a mail address (step Sa9). If the CPU 111 determines that a mail address is not marked(step Sa9 "No"), the CPU 111 carries out storing a URL shown in FIG. 7 (step Sa11).

Figure 7:
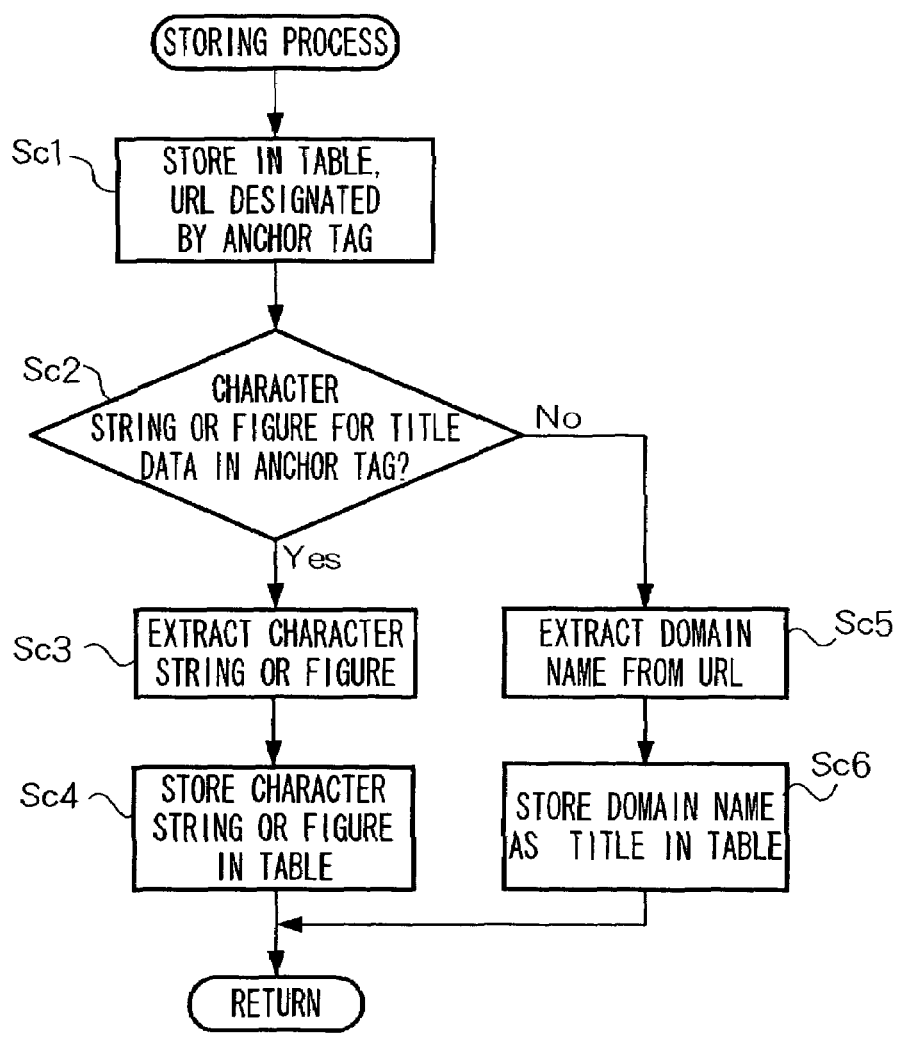
FIG. 7 is a flowchart showing a process of storing a telephone number according to the first embodiment.

First, the CPU 111 extracts the URL marked by the anchor tag and stores the URL in the link destination storing table TBL2 (step Sc1 in FIG. 7). Next, the CPU 111 determines whether any character string or figure which can be used as title data exists in the anchor tag (step Sc2 in FIG. 7). If a character string or figure exists (step Sc2 "Yes" in FIG. 7), the CPU extracts the character string or figure and stores it as title data in the link destination storing table TBL2 (step Sc3, step Sc4 in FIG. 7). In the example shown in FIGS. 4A and 4B, for instance, the character string "*Shibuya restaurant A" is in an anchor tag. The CPU 111 stores the character string "*Shibuya restaurant A" as title data in the link destination storing table TBL2. If an image tag is included in the anchor tag, the CPU 111 stores the image data marked by the image tag as title data in the link destination storing table TBL2.

While in step Sc2 in FIG. 7, if it is determined that no character string which can be used as title data exists in the anchor tag ("No"), the CPU 111 extracts a domain name ("aaa.ne.jp" in FIG. 4) from the URL which has been stored in the link destination storing table TBL2 (step Sc5 in FIG. 7). The CPU 111 then stores the extracted domain name as title data in the link destination storing table TBL2 (step Sc6 in FIG. 7).

Figure 8:
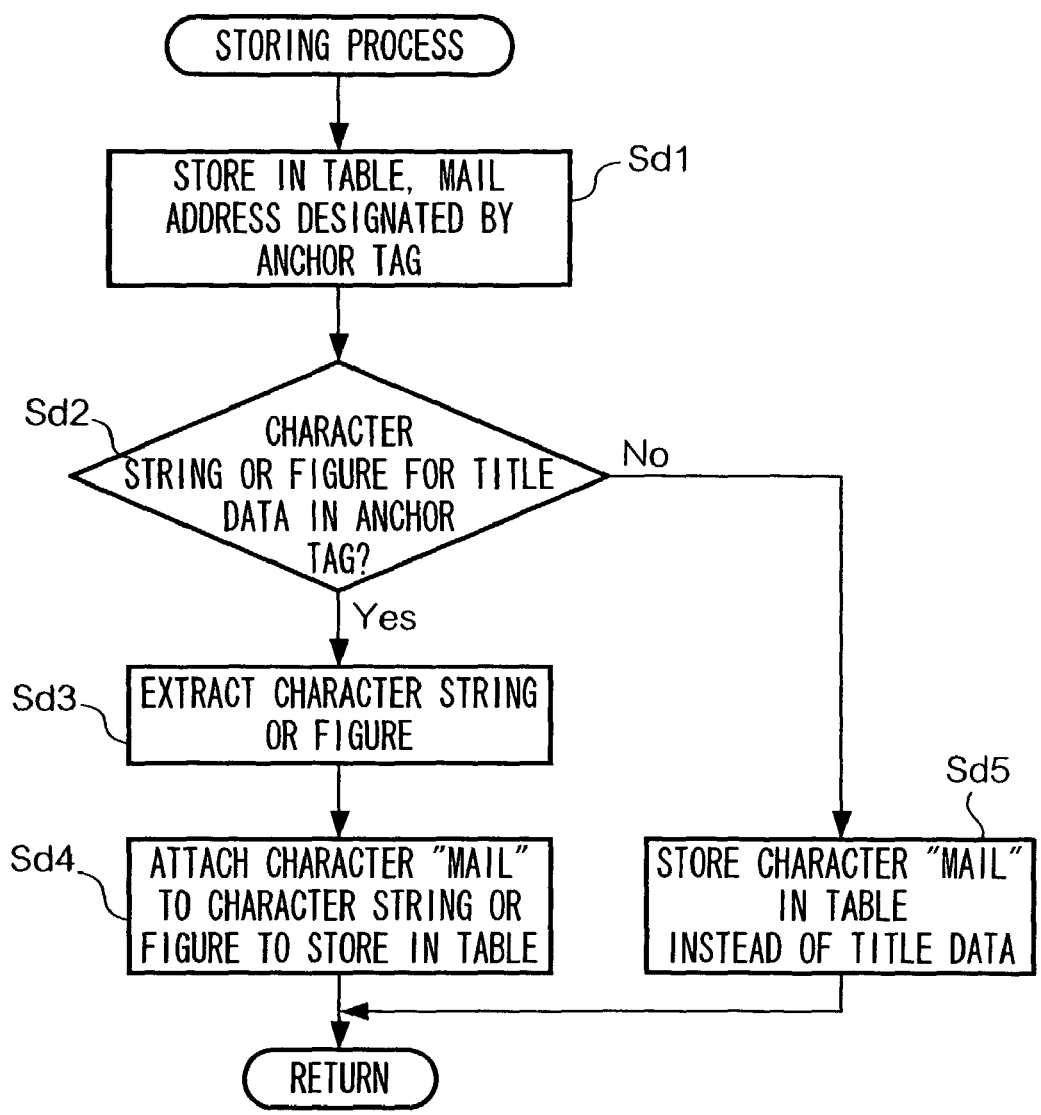
FIG. 8 is a flowchart showing a process of storing a mail according to the first embodiment.

On the other hand, while in step Sa9 in FIG. 5, if it is determined that the anchor tag marks a mail address, the CPU 111 carries out storing an mail address shown in FIG. 8 (step Sa10). First, the CPU extracts the mail address marked by the anchor tag and stores the mail address in the link destination storing table TBL 2 (step Sd1 in FIG. 8). Next, the CPU 111 determines whether any character string or figure which can be used as title data exists in the anchor tag (step Sd2 in FIG. 8). If a character string or figure exists (step Sd2 "Yes"), the CPU 111 extracts the character string or figure. The CPU 111 then adds, to the character string or figure, a symbol (for example, "mail") indicating that the address designates a mail address, and stores the character string or figure as title data in the link destination storing table TBL2 (step Sd3, step Sd4 in FIG. 8). If an image tag designating image data is included in the anchor tags <A herf=> and </A >, a process similar to the process of storing a telephone number is performed. Therefore, description of the process is omitted.

On the other hand, if no character string or figure which can be used as title data is found in the anchor tag (step Sd2

"No" in FIG. 8), the CPU 111 stores, in the link destination storing table TBL2, for example, the symbol "mail" as title data, instead of storing information, such as a character string or the like, to be registered as title data. The CPU 111 then concludes the process (step Sd5).

After finishing the process with one anchor tag, the CPU 111 determines whether search for anchor tags has come to the end of the HTML data (step Sa12). If the CPU 111 determines that the search has been completed (step Sa12 "Yes"), the CPU concludes the registration operation. On the other hand, if the CPU 111 determines that the search has not been completed (step Sa12 "No"), the CPU 111 carries out once again the operations in Steps Sa5 to Sa9 described above.

(1-2) Operation of Mobile Station MS for Searching for URLs

Next, the operation of a mobile station MS for searching for URLs stored in the access destination storing table TBL1 or the link destination storing table TBL2 will be explained. In the following explanation, we assume that the access destination storing table TBL1 and the link destination storing table TBL2 stored in flash memory 114 contain data as shown in FIG. 3A and FIG. 3B. Please note that the following process can be carried out before the mobile station MS performs the packet registration. However, in the following explanation, we assume that the following process starts after the packet registration is made.

Figure 9:
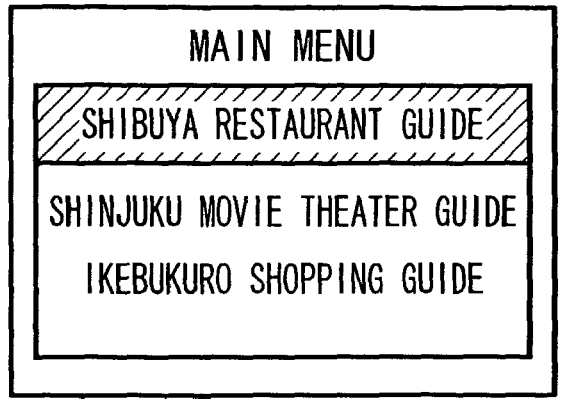
FIG. 9 is a diagram showing an example of a screen image displayed on a liquid crystal display according to the first embodiment.

First, when a user performs a predetermined operation with the command inputting unit 13, the CPU 111 reads out title data from the access destination storing table TBL1 and supplies the title data to the liquid crystal display unit 14. Consequently, the title is displayed on the liquid crystal display unit 14. FIG. 9 is a diagram showing an example of an image displayed on the liquid crystal display unit 14. At this stage, when the user, for example, operates the cursor key of the command inputting unit 13 and temporarily selects a character string, the CPU 111 highlights the character string. In FIG. 9, "restaurant guide in Shibuya" is temporarily selected. In this situation, when the user presses the decision button of the command inputting unit 13, the CPU 111 updates the screen so as to display buttons, from which the user can select, in a predetermined area in the last line on the liquid crystal display unit 14.

Figure 10:
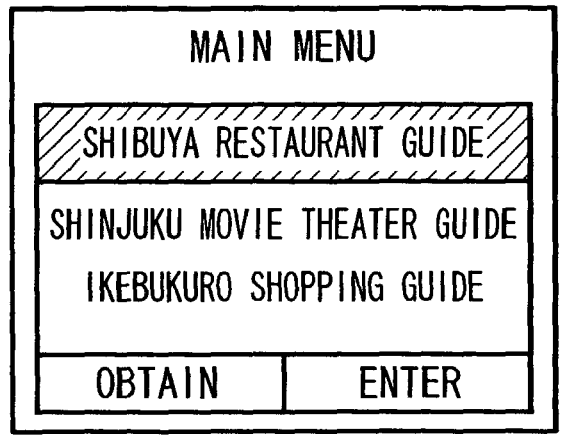
FIG. 10 is a diagram showing an example of a screen image displayed on a liquid crystal display according to the first embodiment.

FIG. 10 is an example of an screen image which is displayed when "restaurant guide in Shibuya" has been selected. When the user selects "obtain", by operating the command inputting unit 13, the CPU 111 reads out, from the access destination storing table TBL1, the URL of "restaurant guide in Shibuya", that is "http://www.aaa.ne.jp". The CPU 111 then transmits a GET request including the URL to the mobile packet communication network MPN.

Figure 11:
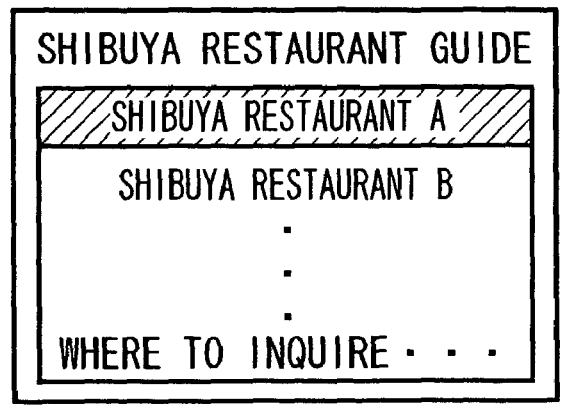
FIG. 11 is a diagram showing an example of a screen image displayed on a liquid crystal display according to the first embodiment.

When the user selects "enter", the CPU 111 reads out title data stored for "restaurant guide in Shibuya" in the corresponding link destination storing table TBL2 and supplies the title data to the liquid crystal display unit 14. Consequently, the screen image shown in FIG. 11 is displayed on the liquid crystal display unit 14. In this situation, when the user selects, for example, "Shibuya restaurant A" by means of the command inputting unit 13, the CPU 111 reads out the URL of "Shibuya restaurant A", that is "http://www.aaa.ne.jp/xxx", from the link destination storing table TBL2 and transmits a GET request including the URL to the mobile packet communication network MPN.

On the other hand, when the user selects the message "Please contact us" by means of the command inputting unit 13, the CPU 111 reads out the telephone number of "Please contact us", that is, "03-111-1111", and carries out calling the telephone number. If a mail address is stored in the link destination storing table TBL2, for example, the following "mail xyz@abc.ne.jp" is displayed. When the user selects the mail address, the process of transmitting an electronic mail to the mail address is carried out.

Access information (a URL, mail address, or telephone number) included in the obtained HTML data is automatically registered in this manner, so that the user does not need to perform wasteful operations such as accessing link destinations only to bookmark the link destinations. Since a link destination storing table TBL2 can store character strings and figures marked by anchor tags as title data, the user can instantly recognize the contents of web pages designated by stored addresses. The search is performed in two steps from the access destination storing table TBL1 to a related link destination storing table TBL2, so that the user can easily search for a desired URL out of the registered URLs.

The access destination storing table TBL1 may not be necessary. The URL of an access destination and all of its link destinations may be stored in one link destination storing table TBL2. Also, it is possible to omit the URL of the access destination. Telephone numbers which have been stored in a link destination storing table TBL2 can be used not only for voice communications but also for data communications between mobile stations MS. The data to be registered is not necessarily marked by an anchor tag. For example, if a character string exists between "#" and "#" in the received data, the character string may be stored in the link destination storing table TBL2. Also, the data format which IP servers W provides is not limited to the HTML format.

[2] Second Embodiment

[2.1] Configuration of Second Embodiment

The configuration of the mobile communication system according to the second embodiment is similar to the one shown in FIG. 1. Thus, unless otherwise specified, the components of the configuration according to the second embodiment are shared by the first embodiment and perform the same operations as those of the first embodiment.

In the second embodiment, the flash memory 114 of the mobile station MS stores an address management table TBL3 instead of the aforementioned access destination storing table TBL1 and link destination storing tables TBL2.

FIG. 12 is a diagram showing the content of an address management table TBL3. The address management table TBL3 stores the URLs of home pages and so on, which the user has actually accessed from the mobile station MS. In relation to each of the stored URLs, the address management table TBL3 also stores title data for the URL and one telephone number and one mail address associated with the page of the URL.

FIG. 13 is an example of HTML data, which the mobile station MS has received in the present embodiment. As shown in FIG. 13, the character string <HOMEMail></HOMEMail> and the character string <HOMEPhone></HOMEPhone> are contained in the HTML data received from an IP server W. <HOMEMail></HOMEMail> is a tag marking the mail address of the webmaster of the page and will hereinafter be referred to as a home mail tag. On the other hand, <HOMEPhone></HOMEPhone> is a tag marking the telephone number of the webmaster of the page, and will be referred to as a home phone tag.

The telephone number and the mail address, marked by these tags, are stored in the address management table TBL3 in relation to the URL of each page. When HTML data does not include these tags, a predetermined telephone number and so on in the page are stored in the address management table TBL3.

(2-1) Operation of Mobile Stations MS in Registering URLs

Next, the operation of the second embodiment having the aforementioned configuration will be explained. First, when a user performs a predetermined operation with the command inputting unit 13 of the mobile station MS, the CPU 111 reads out the WWW browser from the ROM 112 and performs a packet registration with the packet subscriber processing unit (not shown).

Then, when the user makes an input designating the URL of the home page of an IP server W by means of the command inputting unit 13 of the mobile station MS, the CPU 111 of the mobile station MS transmits a GET request in HTTP including the URL to the mobile packet communication network MPN through the transmitter-receiver unit 12. Upon receiving the GET request from the mobile station MS, the IP server W returns, to the mobile station MS, HTML data designated by the URL included in the received GET request through the Internet INET.

When the transmitter-receiver unit 12 of the mobile station MS receives the HTML data from the IP server W, the CPU 111 stores the HTML data in the RAM 113 and displays the image contained in the HTML data on the liquid crystal display unit 14. In this situation, when the user performs a predetermined inputting operation to register the URL, the CPU 111 reads out the aforementioned URL registration program from the ROM 112 and carries out the process shown in FIG. 14.

First, the CPU 111 stores the URL of the home page in the address management table TBL3 (step Se1). Next, the CPU 111 extracts the character string marked by a title tag from the data stored in the RAM 113 (step Se2). The CPU 111 stores the extracted character string as title data in the address management table TBL3 (step Se3). Next, the CPU 111 displays, for example, "Do you want to register the home telephone number and the home mail address of this page?" or the like, on the liquid crystal display unit 14 and prompts the user to make a decision. If the user performs an input operation for ending the registration (step Se4 "No"), the CPU 111 ends the process.

Figure 15:
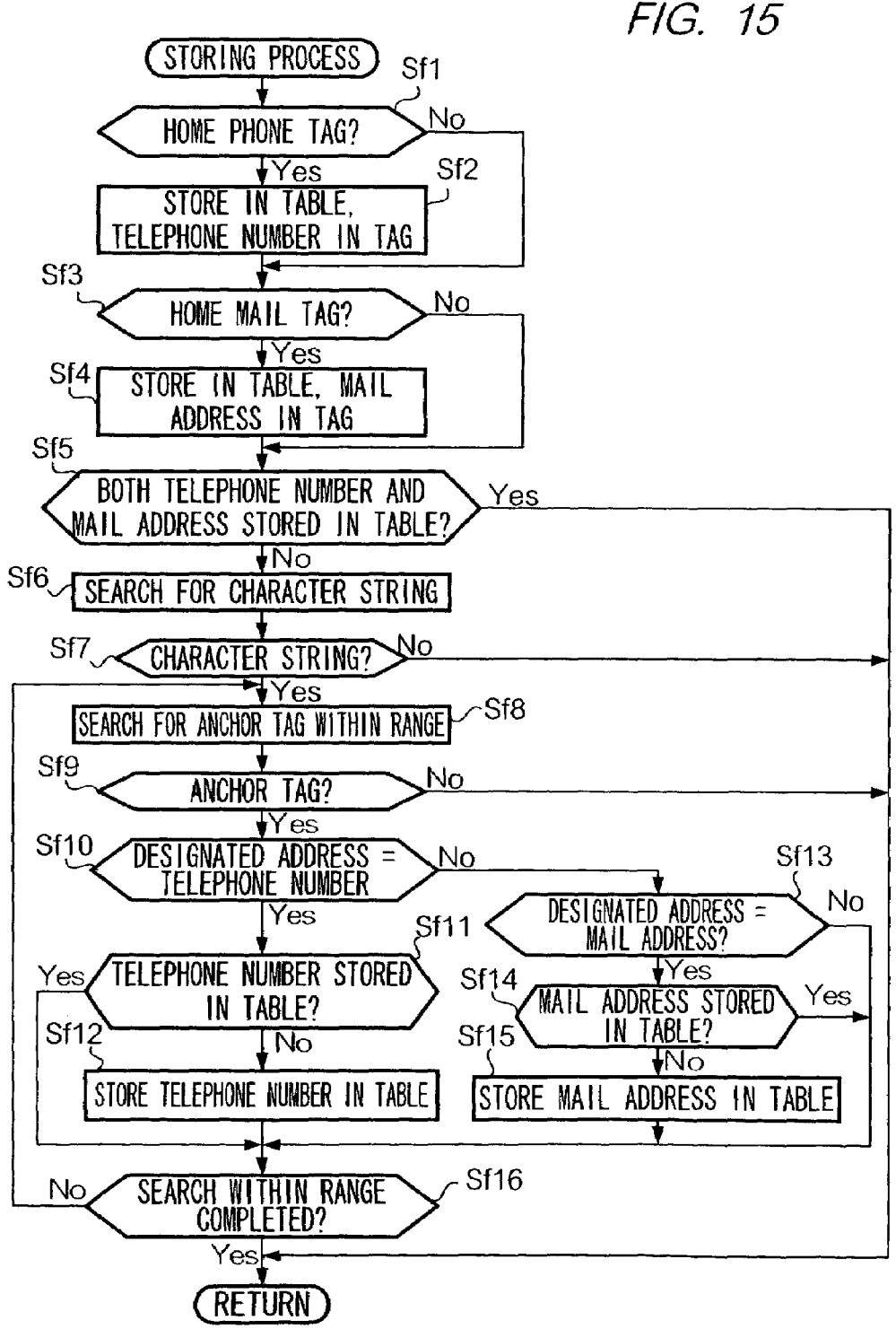
FIG. 15 is a flowchart showing a storing process according to the second embodiment.

On the other hand, if the user performs an input operation for registering the telephone number and the mail address corresponding to the page (step Se4 "Yes"), the CPU 111 carries out the storing process shown in FIG. 15 (step Se5). First, the CPU 111 determines whether any home phone tag exists in the HTML data stored in the RAM 113 (step Sf1). If a home phone tag exists (step Sf1 "Yes"), the CPU 111 extracts the telephone number marked by the home phone tag and stores the telephone number in the address management table TBL3 in relation to the URL of the page (step Sf2). For example, if the content of the HTML data is such as shown in FIG. 13, the CPU 111 extracts the telephone number "03-1111-1111" marked by the home phone tag and stores the telephone number in the address management table TBL3. If no home phone tag is found in the HTML data, the CPU 111 does not store a telephone number (step Sf1 "No").

Next, the CPU 111 determines whether any home mail tag exists in the HTML data (step Sf3). If a home mail tag is found (step Sf3 "Yes"), the CPU 111 extracts the mail address marked by the home mail tag ("aaa@aaa.ne.jp") and stores the mail address in the address management table TBL3 in correspondence with the URL of the page (step Sf4). If the HTML data does not contain any home mail tag such as shown in FIG. 4A, the CPU 111 does not store a mail address (step Sf3 "No").

Next, the CPU 111 determines whether the address management table TBL3 has already stored both home telephone number and home mail address associated with the URL of the page (step Sf5). If both home telephone number and home mail address have already been stored (step Sf5 "Yes"), the CPU 111 concludes the process.

On the other hand, if neither of or only one of home telephone number and home mail address has been stored (step Sf5 "No"), the CPU 111 searches the HTML data for predetermined character strings (step Sf6). Any character strings can be the predetermined character strings as long as the character strings relate to the webmaster of the page. For example, a character string to be searched for may be "contact us". The user may input a character string to be searched for. For example, in the step Sf6, the message "Please input a character string to be searched for." or the like may be displayed on the liquid crystal display unit 14 of the mobile stations MS in order to prompt the user to input a character string to be searched for. If the CPU 111 can not find any of these predetermined character strings (for example, "contact us") (step Sf7 "No"), the CPU 111 concludes the process.

If the CPU 111 finds one of the character strings to be searched for (step Sf7 "Yes"), the CPU 111 searches the HTML data for an anchor tag within a predetermined range, for example, 80 bites of data, from the found character string (step Sf8). This is to prevent the CPU 111 from extracting anchor tags marking addresses which do not relate at all to the found character string. If the CPU 111 cannot find any anchor tag (step Sf9 "No"), the CPU 111 concludes the process.

If the CPU 111 finds an anchor tag (step Sf9 "Yes"), the CPU 111 determines whether the address marked by the anchor tag is a telephone number (step Sf10). If it is determined that the address is a telephone number (step Sf10 "Yes"), the CPU 111 determines whether the telephone number has already been stored in the address management table TBL3 (step Sf11).

If a telephone number has not been stored (step Sf11 "No"), the CPU 111 stores the found telephone number and the URL of the page in the address management table TBL3 in relation to each other (step Sf12). If a telephone number has already been stored (step Sf11 "Yes"), the CPU 111 does not store the found telephone number.

In step Sf9, if it is determined that the address marked by the anchor tag is not a telephone number, the CPU 111 determines whether the address is a mail address (step Sf13). If the CPU 111 determines that the address marked by the anchor tag is a mail address (step Sf13 "Yes"), the CPU 111 determines whether any mail address has been stored in the address management table TBL3 (step Sf14). If a mail address has not been stored (step Sf14 "No"), the CPU 111 stores the found mail address and the URL of the page in the address management table TBL3 in relation to each other (step Sf15).

If it is determined that the address marked by the anchor tag is not a mail address (step Sf13 "No") or a mail address has already been stored (step Sf14 "Yes"), the CPU 111 does not store the mail address.

Next, the CPU 111 determines whether it has completed checking the anchor tags located within the range to be searched (step Sf16). If the CPU 111 determines that it has not completed the search (step Sf16 "No"), the CPU 111 repeats the processes in steps Sf8 to Sf16. If the CPU 111 determines that it has completed the search, the CPU 111 concludes the storing process.

(2-2) Operation of Mobile Station MS for Searching for URLs

Next, the operation of the mobile station MS for searching for URLs stored in the address management table TBL3 will be explained. In the following explanation, we assume that the address management table TBL3 stored in the flash memory 114 contains data as shown in FIG. 12. Please note that the following process can be carried out before the mobile station MS performs the packet registration. However, in the following explanation, we assume that the following process starts after the packet registration is completed.

First, when a user operates a predetermined button of the command inputting unit 13, the CPU 111 reads out the title data from the address management table TBL3 and provides the liquid crystal display unit 14 with the title data for display. Consequently, the menu messages shown in FIG. 9 are displayed on the liquid crystal display unit 14. In this situation, when the user, for example, performs the inputting operation for selecting the message "restaurant guide in Shibuya" displayed in FIG. 9 by means of the command inputting unit 13, the CPU 111 updates the messages displayed on the liquid crystal display unit 14.

Figure 16:
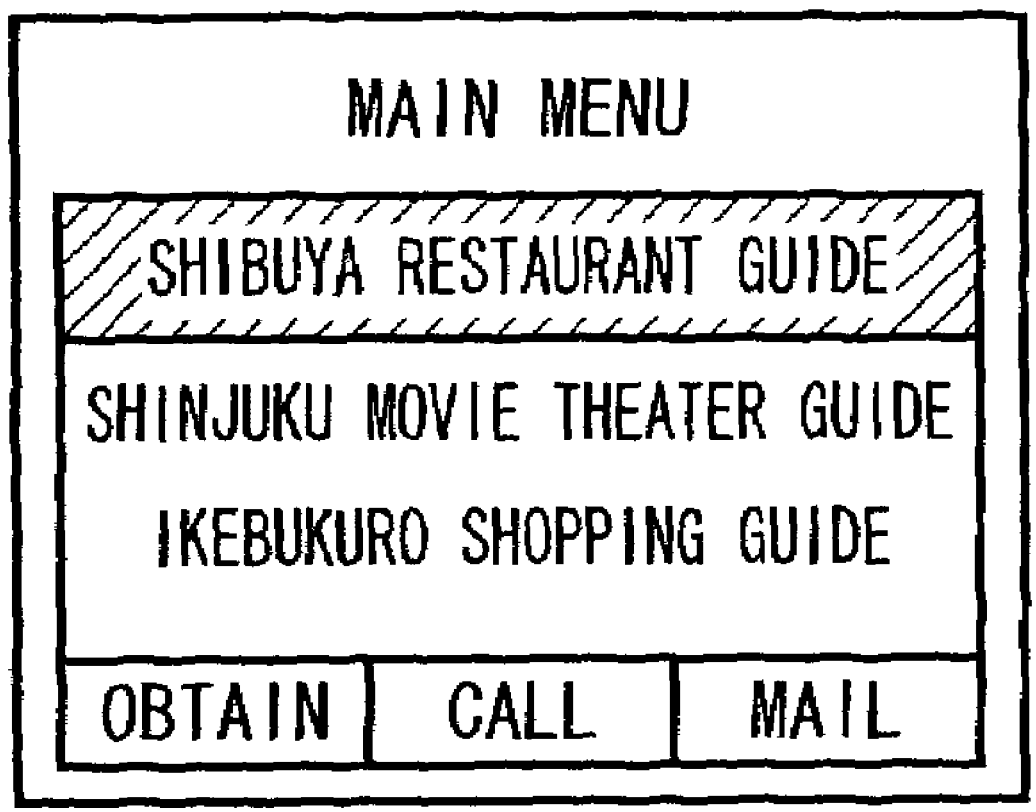
FIG. 16 is a diagram showing an example of a screen image displayed on a liquid crystal display according to the second embodiment.

FIG. 16 shows an example of the updated screen. If "obtain" is selected in FIG. 16, the CPU 111 reads out the URL stored in relation to the selected message and transmits a GET request including the URL to the mobile packet communication network MPN. If "calling" is selected, the CPU 111 carries out calling the telephone number ("03-1111-1111"), which has been stored in relation to the selected message. If "mail" is selected, the CPU 111 carries out transmitting an electronic mail to the destination of the mail address, which has been stored in relation to the selected message.

As described above, the mobile station according to the present embodiment does not register URLs of all link destinations included in an accessed web page, but registers one telephone number and one mail address which are included in the page. Thus, unnecessary addresses can be prevented from being registered. Since the amount of information to be stored in the flash memory is less than that of the first embodiment, a small capacity flash memory can thus be used.

[3] Modifications of First and Second Embodiments

<Modification 1-1>

In the first embodiment, telephone numbers marked by anchor tags are registered in link destination storing tables TBL2. However, a telephone directory may be set up in the flash memory 114 of the mobile station MS to store the telephone numbers.

<Modification 1-2>

In the first and second embodiments, character strings marked by anchor tags may designate a URL, a mail address and a telephone number. However, in the present invention, these are not an exclusive list of designations. A character string may designate another kind of address. Further, the locations for registration (for example, a telephone directory or a mail address directory) and the kinds of information to be registered in the locations may be changed according to the kinds of anchor tags used. That is, a user can freely select not only items to be registered but also management methods regarding the registered items.

<Modification 1-3>

In the first and second embodiments, the mobile station MS communicates with the Internet IP server W through the gateway server GWS. The invention is not limited to such communication structure. A communication structure may be that a personal computer may be connected with the Internet INET through a fixed telephone network. In this case, the personal computer receives HTML data from the Internet INET and carries out the registration processes shown in FIGS. 5 to 8 or FIGS. 14 and 15.

[4] Third Embodiment

Figure 17:
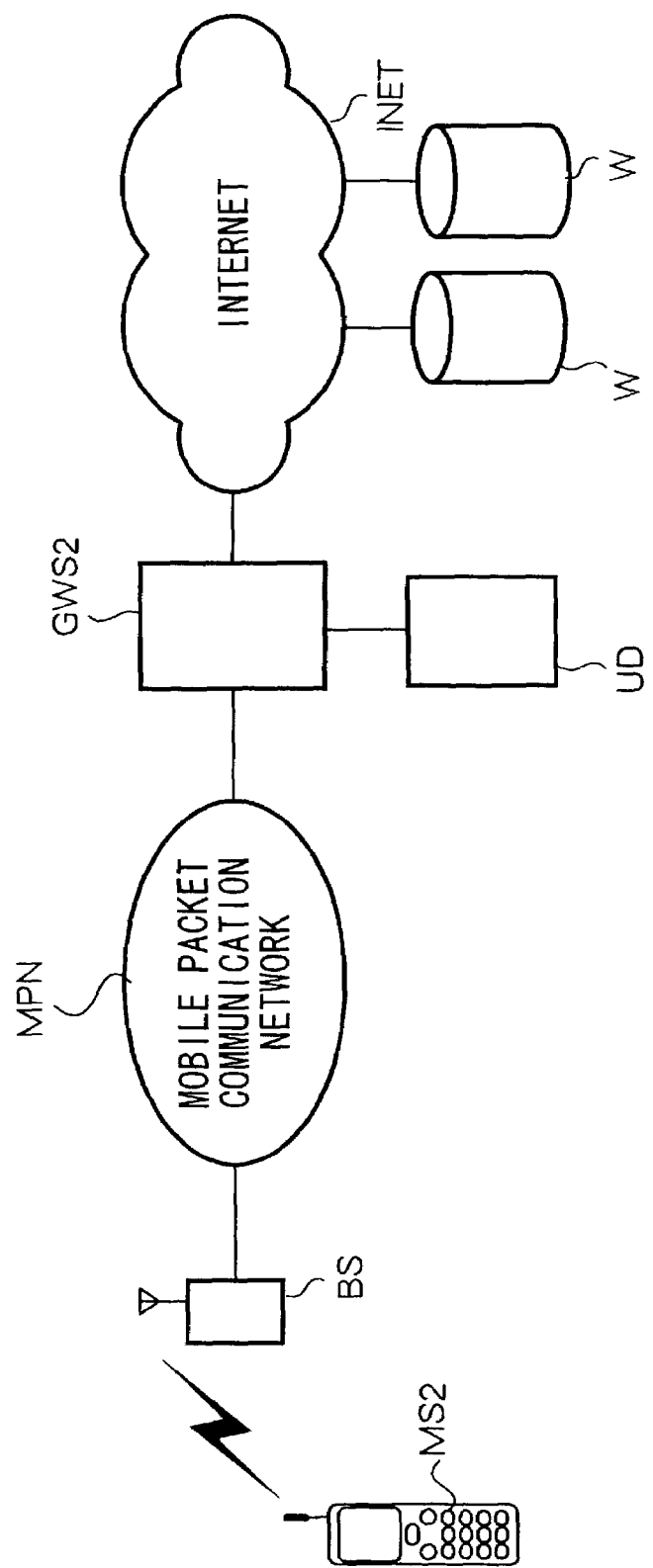
FIG. 17 is a block diagram showing a configuration of a mobile communication system according to the third embodiment.

FIG. 17 is a block diagram showing a configuration of a mobile communication system according to the third embodiment. In FIG. 17, the components corresponding to the components of FIG. 1 are assigned the same references numbers as those of FIG. 1.

In the mobile packet communication system according to the third embodiment, unlike the first embodiment, a mobile station MS2 transmits a request for registering URLs to a gateway server GWS2, and the gateway server GWS2 carries out registering the URLs. Thus, the access destination storing table TBL1 and the link destination storing tables TBL2 are not formed in the flash memory 114 of the mobile station MS2. The gateway server GWS2 performs the same function of relaying communications as the gateway server GWS performs in the first embodiment and performs an additional function of registering URLs according to instructions from the mobile station MS2 as described below.

The gateway server GWS2 comprises a URL registration database UD. The URL registration database UD comprises the access destination storing table TBL1 and the link destination storing tables TBL2 (as shown in FIGS. 3A, 3B), which are provided for each mobile station MS2. Each table is assigned a URL. The gateway server GWS2, upon receiving from a mobile station MS2, a GET request including a URL of one of the tables, transmits HTML data (title data, URL, telephone number, or mail address), which has been stored in the table designated by the URL.

The data format in each of the tables can be arbitrary. However, data transmitted from the gateway server GWS2 to the mobile station MS2 must be HTML data. If the data format of each table is not the HTML format, a conversion of the data format is performed by the gateway server GWS2.

Now, methods by which the mobile station MS2 accesses tables in the URL registration database UD will be described below.

(i) First Method

In the first method, the URL of the access destination storing table TBL1 assigned to a mobile station MS2 is registered in advance in the flash memory of the mobile station MS2. When a user operates the command inputting unit 13 and inputs a predetermined instruction, the CPU 111 transmits, to the mobile packet communication network MPN, a GET request including the URL of a link destination storing table TBL2 also assigned to the mobile station MS2. The gateway server GWS2, upon receiving the GET request, reads out the link destination storing table TBL2 designated by the URL, generates HTML data which has been stored in the table, and transmits the HTML data to the mobile station MS2.

(ii) Second Method

In the second method, when the mobile station MS2 accesses the home page of the gateway server GWS2, the gateway server GWS2 transmits menu data in the HTML format. In the menu data, the URL of the link destination storing table TBL2 assigned to the mobile station MS2 is indicated. More specifically, the gateway server GWS2 extracts the mobile station ID included in the received GET request and identifies the mobile station which has transmitted it on the basis of the mobile station ID. Then, the gateway server GWS2 transmits, to the mobile station MS2, the menu data in which the URL of the table assigned to the mobile station MS2 is marked by an anchor tag.

The gateway server GWS2 comprises a memory. The memory comprises storage areas each allocated to a mobile station MS2. Each storage area is to store HTML data requested by a GET request from a mobile station and received by the gateway server GWS2, and the URL of the location where the HTML data is stored. The HTML data stored in the storage area is then transmitted to the mobile stations MS2 through the mobile packet communication network MPN.

Next, the operation of the third embodiment having the above configuration will be explained.

(3-1) Operation of Gateway Server for Registering URLs

First, when a user performs a predetermined inputting operation with the command inputting unit 13, the CPU 111 of the mobile station MS reads out the WWW browser from the ROM 112 and performs the packet registration with the packet subscriber processing unit (not shown). When the user inputs the URL of the home page of an IP server W with the command inputting unit 13, the CPU 111 transmits a GET request including the URL to the mobile packet communication network MPN through the transmitter-receiver unit 12. The IP server W, upon receiving the GET request from the mobile station MS, transmits, to the gateway server GWS2 through the Internet INET, the HTML data of the web page designated by the URL included in the received GET request.

The gateway server GWS2, upon receiving the HTML data, stores the HTML data and the URL in the storage area of the memory allocated to the mobile station MS2 to which the HTML data will be transmitted. The gateway server GWS2 then reads out the HTML data from the storage area and transmits the HTML data to the mobile station MS2.

When the mobile station MS2 receives the HTML data through the transmitter-receiver unit 12, the CPU 111 stores the HTML data in the RAM 113 and displays the HTML data on the liquid crystal display unit 14. In this situation, when the user performs a predetermined operation with the command inputting unit 13, the CPU 111 reads out the mobile station ID of the mobile station MS2 from the ROM 112 and transmits, to the gateway server GWS2, a request for registering the URL, along with the mobile station ID.

The gateway server GWS2, upon receiving the request for registration, extracts the mobile station ID from the registration request and identifies the mobile station. The gateway server GWS2 reads out, from the storage area allocated to the mobile station MS2, the URL and the HTML data stored in the storage area. The gateway server GWS2 then performs an extraction operation similar to the one shown in FIGS. 5 to 7. That is, the gateway server GWS2 stores the URL, which has been read out, in the access destination storing table TBL1 of the URL registration database UD assigned to the mobile station MS2 (step Sa1 in FIG. 5). Next, the gateway server GWS2 extracts a character string marked by a title tag and stores the character string as title data in the access destination storing table TBL1 of the URL registration database UD (steps Sa2, Sa3 in FIG. 5).

After storing the URL, the gateway server GWS2 reports to the mobile station MS2 that the process of storing the URL in the access destination storing table TBL1 has been completed. The CPU 111 of the mobile station MS2, upon receiving the report from the gateway server GWS2, displays a message, for example, "Do you want to register the URL of the link destination?" or the like, on its liquid crystal display unit 14. At this time, if the user performs the input operation for ending the registration, the CPU 111 transmits a request for ending the registration to the gateway server GWS2 through the transmitter-receiver unit 12. The gateway server GWS2, upon receiving the request for ending the registration, ends the registration process (step Sa4 "No"). If the user performs the input operation for continuing the registration process, the CPU 111 transmits a request for continuing the registration to the gateway server GWS2.

The gateway server GWS2, upon receiving the request for continuing the registration process (step Sa4 "Yes"), performs the processes in steps Sa5 to Sa12. That is, in step Sa8, a telephone number is stored as shown in FIG. 6. In step Sa11, a URL is stored as shown in FIG. 7. In step Sa10, a mail address is stored as shown in FIG. 8. The process of registering addresses by the gateway server GWS2 is similar to that performed by the mobile station MS in the first embodiment. Description of the process is therefore omitted.

(3-2) Operation of Mobile Communication System for Searching for URLs

Next, the operation of the mobile communication system according to the third embodiment for searching the URL registration database UD in reply to an instruction from the mobile station MS will be explained.

We assume that the mobile station MS accesses the gateway server GWS2 by the aforementioned second method, and the packet registration has already been performed. To make the discussion simple, we assume that the contents of the access destination storing table TBL1 and the link destination storing table TBL2 in the URL registration database UD are such as those shown in FIGS. 3A and 3B.

First, when a user inputs the URL of the home page of the gateway server GWS2 with the command inputting unit 13, the CPU 111 transmits a GET request including the URL. The gateway server GWS2, upon receiving the GET request, identifies the mobile station MS2 from the mobile station ID included in the GET request and locates the access destination storing table TBL1 assigned to the mobile station MS2. The gateway server GWS2 generates menu data in which the URL of the access destination storing table TBL1 is marked by an anchor tag and transmits the menu data to the mobile station MS2.

Figure 18:
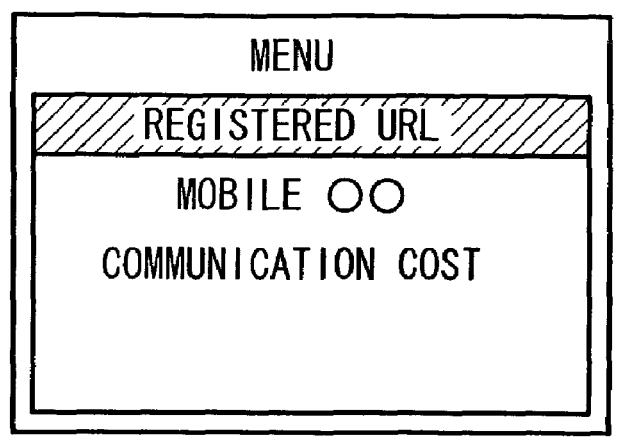
FIG. 18 is a diagram showing an example of a screen image displayed on a liquid crystal display according to the third embodiment.

When the mobile station MS2 receives the menu data, the CPU 111 stores the menu data in the RAM 113 and displays the menu data on the liquid crystal display unit 14. FIG. 18 is an example of menu data displayed on the liquid crystal display unit 14. While the menu data is being displayed, if the user, for example, performs a predetermined operation by means of the command inputting unit 13 and temporarily selects a menu item on the menu, the CPU 111 highlights the temporarily selected menu item. In FIG. 18, "registered URL" is temporarily selected. At this stage, if the user presses the decision button of the command inputting unit 13, the CPU 111 extracts the URL (that is, the URL of the access destination storing table TBL1 assigned to the mobile station MS2) marked by an anchor tag in the menu data and transmits a GET request including the URL to the gateway server GWS2.

The gateway server GWS2, upon receiving the GET request, extracts information from the access destination storing table TBL1. The gateway server GWS2 generates HTML data based on the extracted information and transmits the HTML data to the mobile station MS2. Specifically, HTML data is generated in which the URL stored in the access destination storing table TBL1 and the title data of the URL are marked by anchor tags, and the URL of the link destination storing table TBL2 corresponding to the URL stored in the access destination storing table TBL1 is marked by an anchor tag, and is transmitted to the mobile station MS.

Figure 19:
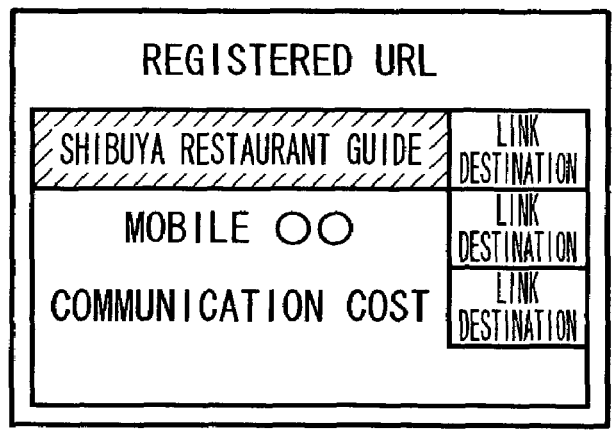
FIG. 19 is a diagram showing an example of a screen image displayed on a liquid crystal display according to the third embodiment.

FIG. 19 is an example of a menu screen displayed on the liquid crystal display unit 14 when the mobile station MS2 receives the HTML data. In this situation, if the user operates the cursor key of the command inputting unit 13 and temporarily selects one of the menu items, CPU 111 highlights the selected menu item. In FIG. 19, "restaurant guide in Shibuya" is highlighted. In this situation, if the user presses the decision button of the command inputting unit 13, the CPU 111 extracts the URL of the menu item "restaurant guide in Shibuya", "http://www.aaa.ne.jp", and transmits a GET request including the URL to the mobile packet communication network MPN.

If the use highlights "link destination" displayed on the right side of "restaurant guide in Shibuya" and presses the decision button, the CPU 111 extracts the URL of the link destination storing table TBL2 corresponding to "restaurant guide in Shibuya". The CPU 111 transmits a GET request in HTTP including the URL to the mobile packet communication network MPN.

The gateway server GWS2 receives the GET request and accesses the link destination storing table TBL2 designated by the URL included in the GET request. The gateway server GWS2 generates HTML data, in which the URL stored in the link destination storing table TBL2 and title data of the URL are marked by anchor tags, and transmits the HTML data to the mobile station MS2. The mobile station MS2, upon receiving the HTML data, displays the same menu screen as shown in FIG. 11 on the liquid crystal display unit 14.

In this situation, if the user performs an input operation to select "Shibuya restaurant A" with the command inputting unit 13, the CPU 111 extracts the URL of "Shibuya restaurant A", "http://www.aaa.ne.jp/xxx", in the link destination storing table TBL2 and transmits a GET request in HTTP including the URL to mobile packet communication network MPN. If the user selects "Please contact us", the CPU 111 extracts the corresponding telephone number "03-1111-1111" and carries out calling the telephone number. If the HTML data includes a mail address, and the user performs the inputting operation for selecting the mail address, the CPU 111 carries out transmitting an electronic mail to the destination of the mail address.

As described above, in the present embodiment, the gateway server GWS comprises the URL registration database UD and performs the process of registering addresses. Thus, mobile stations, in this embodiment, do not need to have an access destination storing table, a link destination storing table or an address registration processing program, and therefore a small capacity flash memory can be used. Further, it is possible to prevent registered URLs from being deleted due to a breakdown of the mobile stations, or an operation mistak by users.

The access destination storing table TBL1 may not be necessary if the link destination storing table TBL2 stores URLs and others of access destinations and link destinations. It is possible to omit URLs of access destinations. Telephone numbers stored in the link destination storing table TBL2 can be used not only for voice communication but also, for example, data communication between mobile stations MS.

[5] Fourth Embodiment

The configuration of the mobile communication system according to the fourth embodiment is the same as shown in FIG. 17. Thus, unless otherwise specified, the components of the configuration shown in FIG. 17 are the same as used in the first embodiment and perform the same functions as those in the first embodiment.

The URL registration database UD in the third embodiment comprises access destination storing tables TBL1, and link destination storing tables TBL2 which correspond respectively to mobile stations MS2 (FIG. 3). In the fourth embodiment, the URL registration database UD, in place of these tables, comprises address management tables TBL3 corresponding respectively to the mobile stations MS2 (FIG. 12). The address management table TBL3 is same in structure as that of the aforementioned second embodiment. Therefore, description thereof is omitted.

In the present embodiment, the HTML data to be received by mobile stations may include a home phone tag and a home mail tag. These tags are already discussed in the second embodiment. Therefore, description thereof is omitted.

Next, the operation of the fourth embodiment will be explained.

(4-1) Operation of Gateway Server for Registering URLs

First, according to an input operation by a user with the command inputting unit 13, the CPU 111 reads out the WWW browser from the ROM 112 and performs a packet registration with the packet subscriber processing unit (not shown). Then, when the user inputs the URL of the home page of an IP server W by means of the command inputting unit 13 of the mobile station MS2, the CPU 111 transmits a GET request including the URL to the mobile packet communication network MPN through the transmitter-receiver unit 12. The IP server W, upon receiving the GET request, transmits HTML data designated by the URL included in the GET request to the gateway server GWS2 through Internet the INET. The gateway server GWS2, upon receiving the HTML data, identifies the mobile station from the mobile station ID included in the GET request, and stores the HTML data and the URL of the HTML data in a storage area of the memory assigned to the mobile station MS2. The gateway server GWS2 then reads out the HTML data stored in the storage area and transmits the HTML data to the mobile station MS2.

When the mobile station MS2 receives the HTML data, the CPU 111 stores the HTML data in the RAM 113 and displays the HTML data on the liquid crystal display unit 14. In this situation, if the user presses a predetermined button of the command inputting unit 13, the CPU 111 reads out the mobile station ID of the mobile station MS2 from the ROM 112 and transmits, to the gateway server GWS2, a request for registering the URL including the mobile station ID.

The Gateway server GWS2, upon receiving the request for registration, extracts the mobile station ID from the registration request and identifies, based on the mobile station ID, the storage area assigned to the mobile station MS2 and the address management table TBL3 likewise assigned to the mobile station MS2. The gateway server GWS2 reads out the URL and the HTML data of the web page designated by the URL from the storage area assigned to the mobile station MS2, which has transmitted the registration instruction.

Figure 14:
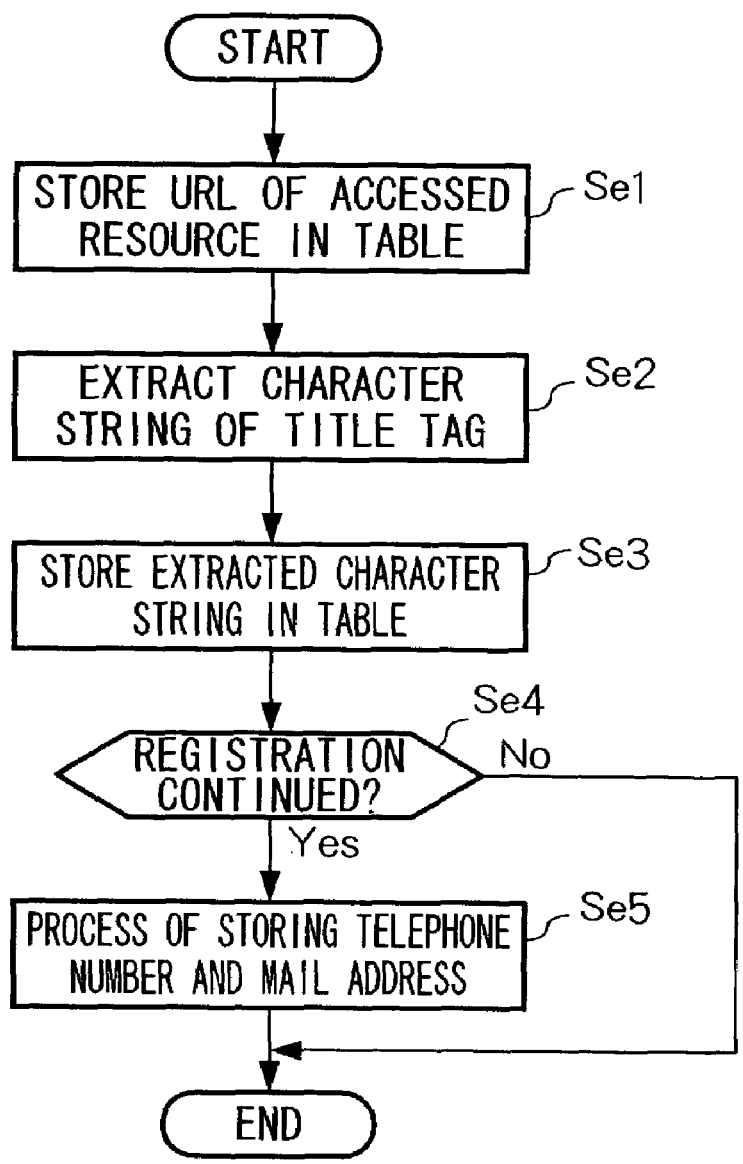
FIG. 14 is a flowchart showing a process of registering a URL by a mobile station MS according to the second embodiment.

The gateway server GWS2 then carries out the same processes as shown in FIGS. 14 and 15, which have already been discussed in the second embodiment. That is, the gateway server GWS2 stores the URL, which has been read out, in the address management table TBL3 of the URL registration database UD assigned to the mobile station MS2 (step Se1 in FIG. 14). Next, the gateway server GWS2 extracts a character string marked by a title tag in the HTML data and stores the character string as title data in the address management table TBL3 of the URL registration database UD (step Se2, Se3 in FIG. 14). After storing the character string, the gateway server GWS2 reports, to the mobile station MS2, that the character string has been stored in the address management table TBL3.

The CPU 111, upon receiving the report from the gateway server GWS2, displays the message, "Do you want to register the telephone number and the mail address corresponding to the page?" or the like on the liquid crystal display unit 14. At this stage, if the user performs, with the command inputting unit 13, an input operation indicating that the use does not wish to register them, the CPU 111 transmits a request to end the registration process to the gateway server GWS2 through the transmitter-receiver unit 12. The gateway server GWS2, upon receiving the request, ends the registration process (step Se4 "No" in FIG. 14).

If the user performs an input operation for proceeding with the registration process with the command inputting unit 13, the CPU 111 transmits a request to proceed with registration to the gateway server GWS2 through the transmitter-receiver unit 12. The gateway server GWS2, upon receiving the request to proceed with registration (step Se4 "Yes" in FIG. 14), carries out the storing process as shown in FIG. 15. This process is same as the process performed by the mobile station MS in the second embodiment. Therefore, description thereof is omitted.

(4-2) Operation of Mobile Communication System for Searching for URLs

The operation of the mobile communication system for searching the URL registration database UD will be explained. In the following explanation, we assume that the content of address management table TBL3 is the same as shown in FIG. 12, and the packet registration process has already been performed.

First, if a user inputs the URL of the home page of the gateway server GWS2 with the command inputting unit 13 of the mobile station MS2, the CPU 111 transmits a GET request including the URL. The gateway server GWS2 identifies the address management table TBL3 assigned to the mobile station MS2 on the basis of a mobile station ID included in the GET request. Then, the gateway server GWS2 generates menu data and transmits the menu data to the mobile station MS2. The operation of generating the menu data and the content of the menu data are already discussed in the third embodiment. Therefore, description thereof is omitted.

The CPU 111, upon receiving the menu data, stores the menu data in the RAM 113, and displays the menu data on the liquid crystal display unit 14. Consequently, the screen image shown in FIG. 18 is displayed on the liquid crystal display unit 14. In this situation, if the user selects "registered URL" by means of the command inputting unit 13, the CPU 111 extracts the URL marked by an anchor tag in the menu data (that is, the URL of the address management table TBL3 assigned to the mobile station MS2), and transmits a GET request including the URL to the gateway server GWS2.

Figure 20:
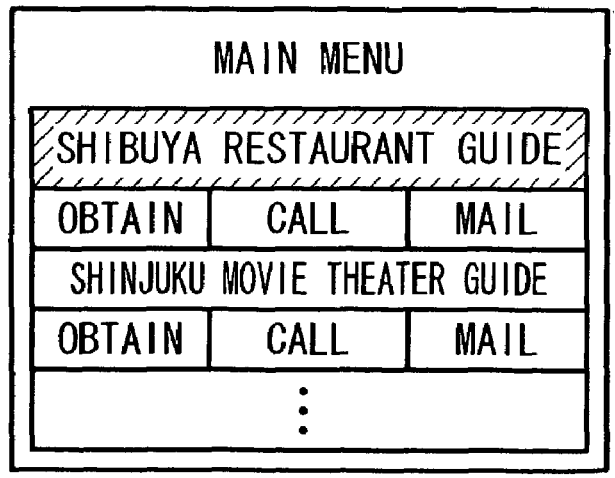
FIG. 20 is a diagram showing an example of a screen image displayed on a liquid crystal display according to the fourth embodiment.

The gateway server GWS2 accesses the address management table TBL3 assigned to the mobile station MS2 in response to the received GET request. The gateway server GWS2 generates HTML data from the information stored in the address management table TBL3 and transmits the HTML data to the mobile station MS2. FIG. 20 is an example of a screen image displayed on the liquid crystal display unit 14 when the mobile station MS2 receives the HTML data. Buttons of "obtain", "calling", and "mail" are displayed at the bottom of the screen.

The button "obtain" designates the URL which has been stored in the address management table TBL3 in relation to the title data. For example, the button "obtain" of "restaurant guide in Shibuya" designates the URL "http://www.aaa.ne.jp". If the user selects the button, the CPU 111 transmits a GET request including the URL "http://www.aaa.ne.jp".

The button "calling" designates the telephone number which has been stored in the address management table TBL3 in relation to the title data. If the button "calling" is selected, the CPU 111 calls the telephone number designated by the button. The button "mail" designates the mail address which has been stored in the address management table TBL3 in relation to the title data. If the button "mail" is selected, the CPU 111 carries out transmitting an electronic mail to the destination of the mail address designated by the button.

In the fourth embodiment, the addresses of the link destinations in a page which has been accessed are not all registered in the URL registration database UD of the gateway server GWS2. Only the telephone number and the mail address associated with the downloaded page are registered. Thus, unnecessary addresses are not registered in the URL registration database UD. The amount of information to be registered is less than that of the third embodiment, so that the storage device of the gateway server GWS2 for storing the URL registration database UD can be small, and the search time can be shortened.

[6] Modification of Third and Fourth Embodiments

<Modification 2-1>

In the third and fourth embodiments, the gateway server GWS2 has the function of registering URLs. However, another server may perform registration of URLs. In such a case, a mobile station MS2 transmits, to the server, HTML data, which has been obtained from an IP server W on the Internet INET. The server then carries out the aforementioned processes for registering URLs. Thus, the process load on the gateway server GWS2 associated with registration can be reduced.

In the third embodiment, a mobile station may comprise an access destination storing table TBL1 and link destination storing tables TBL2. For example, after the gateway server GWS2 carries out the process for registration, the mobile station MS2 accesses the gateway server GWS2 and downloads the access destination storing table TBL1 and the link destination storing tables TBL2. Search for URLs and other work are performed by the mobile station in the downloaded access destination storing table TBL1 and link destination storing tables TBL2.

In this manner, the mobile station MS2 and the gateway server GWS2 both have the access destination storing table TBL1 and the link destination storing tables TBL2. Therefore, even if the address information (URLs, mail addresses, telephone numbers or the like), which has been stored in the mobile station MS2, is deleted due to a breakdown of the mobile station MS2 or a faulty operation by a user, the same information can be downloadable from the gateway server GWS2. Needless to say, the address management table TBL3 can likewise be provided in the mobile station MS2 in the fourth embodiment.

As explained above, through a receiving device or a relay device of the present invention it becomes possible to effectively perform address registrations, so that user labor can be reduced and communication costs can be kept down.

The invention is not limited to specific configurations of the aforementioned embodiments, and can take various other forms within the confines of the claims.

The invention claimed is:

1. A terminal that records references to points of communication contained in display data and communicates selectively to a point of communication referenced by a recorded reference, comprising:
   a receiver that receives display data which contains at least one reference to a point of communication which is not a point of communication from which the display data originated, the reference is of a type selected from at least a telephone number, an e-mail address and a uniform resource locator;
   a reference locator that extracts the reference contained in the received display data and stores the extracted reference in a memory;
   a selector that reads out the reference stored in the memory;
   multiple communication functionalities selectively activated according to a type of reference in order to communicate to a point of communication referenced by the reference; and
   a communication control that automatically reconfigures the terminal to communicate to a point of communication referenced by the read-out reference, using at least one of the multiple communication functionalities conforming to the type of the read-out reference.

2. A terminal according to claim 1, wherein the terminal is a wireless telephone.

3. A terminal according to claim 1, wherein the extracted reference is stored in the memory, along with a description and/or an illustration found in the display data in association with the extracted reference.

4. A terminal according to claim 1, wherein the extracted reference is stored in the memory, along with a description and/or an illustration generated by the terminal in association with the extracted reference.

5. A terminal according to claim 1, wherein the display data is a web page obtained from a web site through an Internet.

6. A terminal according to claim 1, wherein the reference locator extracts and stores a reference at request by a user of the terminal.

7. A terminal according to claim 1, wherein in locating a reference in the display data, the reference locator searches the display data for characters and/or symbols representing the reference.

8. A terminal according to claim 1, wherein in locating a reference in the display data, the reference locator searches the display data based on characters and/or symbols given by a user of the terminal.

9. A terminal according to claim 1, wherein the multiple communication functionalities comprise a telephone communication functionality, an e-mail communication functionality and a data network communication functionality.

10. A terminal according to claim 1, wherein a point of communication has multiple references of at least one type and the memory is configured to store the multiple references for the point of communication.

11. A terminal according to claim 1, wherein the reference locator extracts characters and/or symbols representing the display data and stores them in the memory as an index for the stored reference.

12. A terminal according to claim 1, wherein in locating a reference in the display data, the reference locator searches for an anchor tag in the display data.

* * * * *